United States Patent [19]

Ueki et al.

[11] Patent Number: 5,073,778
[45] Date of Patent: Dec. 17, 1991

[54] DIGITAL TO ANALOG CONVERTER WITH DITHER USING TWO PARALLEL PATHS

[75] Inventors: Masaaki Ueki, Tokyo; Nobuyuki Yasuda, Chiba; Toshihiko Masuda, Tokyo, all of Japan

[73] Assignee: Sony Corporation, Tokyo, Japan

[21] Appl. No.: 428,958

[22] Filed: Oct. 30, 1989

[30] Foreign Application Priority Data

Nov. 15, 1988 [JP] Japan .................. 63-288127

[51] Int. Cl.$^5$ ............................................. H03M 1/20
[52] U.S. Cl. ..................................... 341/131; 341/143
[58] Field of Search ......................... 341/131, 143, 144

[56] References Cited

U.S. PATENT DOCUMENTS

| | | | |
|---|---|---|---|
| 4,467,316 | 8/1984 | Musmann et al. | 341/144 |
| 4,542,369 | 9/1985 | Kasuga | 341/144 |
| 4,853,780 | 8/1989 | Kojima et al. | 341/143 X |
| 4,864,305 | 9/1989 | Toyama | 341/144 |
| 4,937,576 | 6/1990 | Yoshio et al. | 341/131 |
| 4,968,987 | 11/1990 | Naka et al. | 341/143 |

FOREIGN PATENT DOCUMENTS 51-48214 4/1976 Japan .

OTHER PUBLICATIONS

Yamasaki, Journal of the Acoustical Society of Japan, vol. 39, No. 7, Jul. 1983, pp. 452-462, "Application of Large Amplitude Dither to the Quantization of Wide Range Audio Signals".

Primary Examiner—Howard L. Williams
Attorney, Agent, or Firm—Lewis H. Eslinger; Jay H. Maioli

[57] ABSTRACT

A signal processing apparatus reduces the quantization noise by using so-called noise shaping circuits. The input signal may be audio or video signals. One of the noise shaping circuits is supplied with a signal which is the relative addition of the input signal and a dither while the other noise shaping circuit is supplied with a signal which is the relative subtraction of the input signal and the dither. The signal components of the outputs of the noise shaping circuits are effectively combined to cancel the dither components to produce an output with an improved S/N ratio. A plurality of such signal processing apparatus may be arranged in parallel, in which case different dithers are used in the respective signal processing apparatus and the outputs of the respective signal processing apparatus are combined to further improve the S/N ratio.

5 Claims, 5 Drawing Sheets

DIGITAL TO ANALOG CONVERTER WITH DITHER USING TWO PARALLEL PATHS

BACKGROUND OF THE INVENTION

1. Field of the Invention

This invention relates to a signal processing apparatus making use of a so-called noise shaping circuit to reduce the quantization noise.

2. Description of the Prior Art

Noise shaping is a technology according to which the quantization noise produced at the time of quantizing or rounding data such as audio or video signal data is changed in its spectrum so that the noise level in the audio range is reduced significantly to improve the signal to noise (S/N) ratio. To implement such noise shaping, a feeding back of quantization error components to the input side is employed, as disclosed for example in "Adaptive Noise Spectral Shaping and Entropy Coding in Predictive Coding of Speech" appearing in IEEE Transactions on Acoustics, Speech and Processing, February, 1979, vol. ASSP -27, No. 1, pages 63 to 73. However, when an audio signal, for example, is subjected to such noise shaping, it may occur that a characteristic pattern, so-called idling pattern, which is rather harsh to the ear, is produced at minute signal levels.

The conventional practice to overcome such inconvenience is to perform noise shaping after a dither signal is added to an input signal, as disclosed in the Japanese laid open Patent Publication No. 51-48214, and as shown herein in FIG. 6.

In this figure, an input signal supplied to an input terminal 61 is transmitted to an adder 62 where it is added to a dither signal from a dither generator 63 before being transmitted to a noise shaping circuit 64. The output from the noise shaping circuit 64 is transmitted to a D/A (digital-to-analog) converter 65 and thereby converted into corresponding analog signals which are taken out at an output terminal 68.

FIG. 7 shows the frequency spectrum of the output signals from an output terminal 68. In this figure, X stands for an input signal, D a dither signal introduced at the input side and $V_N$ a quantization error component. By noise shaping, the quantization noise component $V_N$ shows a lower noise level for the lower frequencies in the audio range. The output signal Y from the output terminal 68 is represented by the following formula (1)

$$Y = X + D + V_N \quad (1)$$

Hence, an inconvenience arises that the dither signal D is supplied as an output even though there is no input signal, that is the input signal X is zero. Meanwhile, the signal to quantization noise power ratio or S/N ratio is given by the formula (2)

$$S/N = X^2 / V_N^2 \quad (2)$$

It is also necessary that the frequency range of the introduced dither signal be outside the audio range, while it is also necessary that the dither signal remaining at the time of D/A conversion be removed by a low pass filter.

SUMMARY OF THE INVENTION

It is an object of the present invention to obviate the above inconveniences of the prior art and to provide a signal processing apparatus according to which a dither signal component in the output signal which is obtained by introducing a dither signal into an input signal and noise shaping the resulting mixed signal may be cancelled by a simplified system.

It is another object of the present invention to provide a signal processing apparatus whereby the signal to quantization noise ratio or S/N ratio may be further improved.

According to the signal processing apparatus of the present invention, at least two noise shaping circuits are employed. One of the noise shaping circuits is supplied with the sum of the dither signal and the input signal while the other noise shaping circuit is supplied with a difference signal between the dither signal and the input signal. The output signals from the noise shaping circuits are summed together or subtracted one from the other so that the respective input signal components are effectively summed together while the dither signal components are cancelled.

Therefore, at the final stage of signal addition or subtraction, the dither signal components in the output signals are cancelled by signal subtraction and the input signal components are doubled in amplitude and squared in power by signal addition, whereas the quantization noise components in the output signals are simply doubled in power, resulting in the improved S/N ratio.

DETAILED DESCRIPTION OF THE PREFERRED EMBODIMENTS

Figure 1:
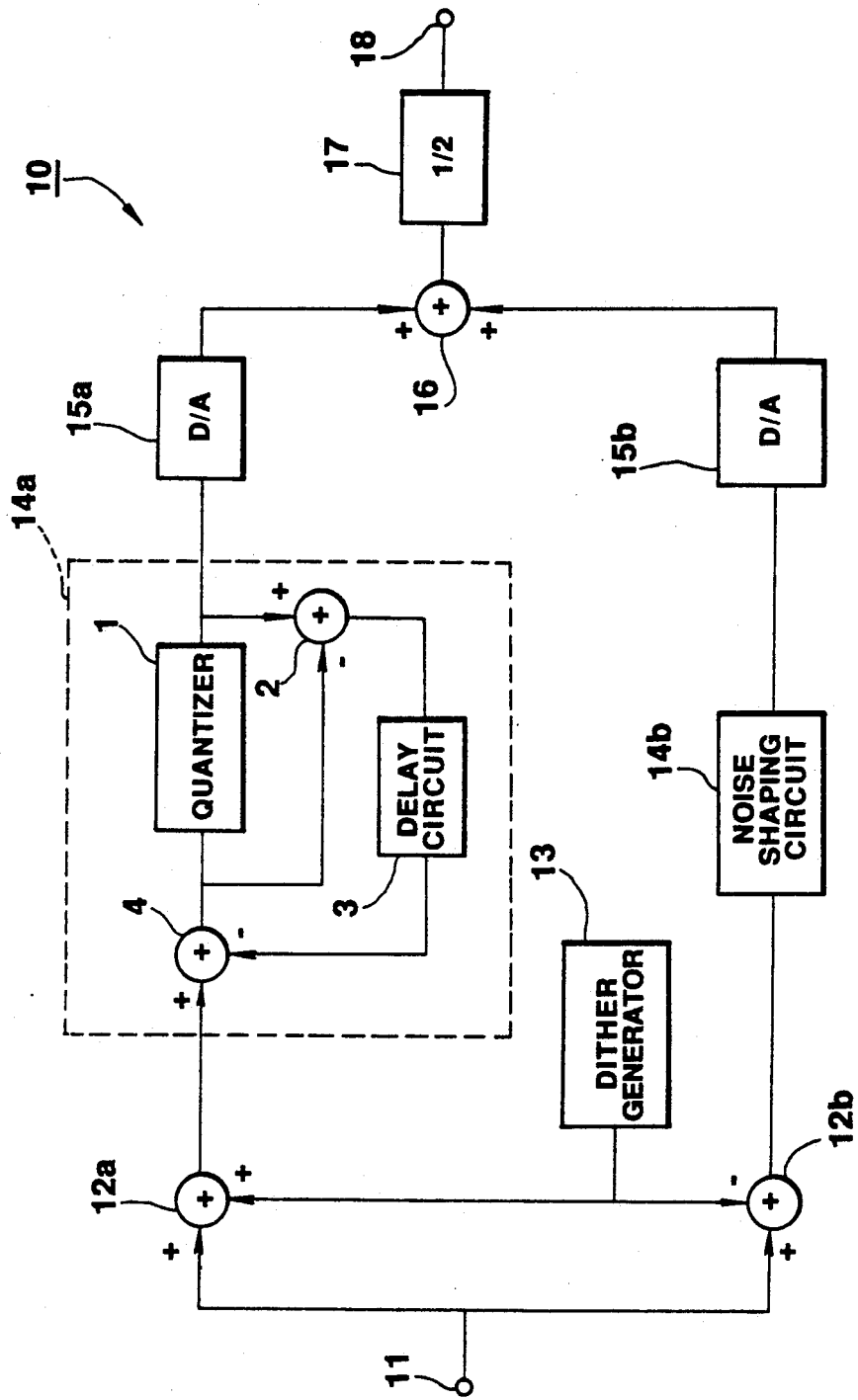
FIG. 1 is a block circuit diagram showing a first embodiment of a signal processing apparatus according to the present invention.

FIG. 1 shows, in a block circuit diagram, a first embodiment of a signal processing apparatus according to the present invention.

In the signal processing apparatus 10, shown in FIG. 1, a digital audio signal composed of, for example, 16 bits, is supplied to an input terminal 11 and thence to adders 12a and 12b. A dither signal from a dither generator 13 is added to the input signal at an adder 12a and the resulting sum signal is supplied to a noise shaping circuit 14a. The dither signal from the dither generator 13 is subtracted from the input signal at an adder 12b and the resulting difference signal is supplied to a noise shaping circuit 14b. The noise shaping circuits 14a, 14b are of the same construction in which quantization errors produced when reducing the number of bits of the input digital signal by a quantizer or requantizer, for example, rounding a 16-bit input to a 4-bit output, are fed back to the input side, by way of an error feedback operation. That is, the noise shaping circuit 14a or 14b is so arranged and constructed that an input to a quantizer 1 is subtracted from an output to the quantizer 1 by an adder 2 and the resulting subtraction output or quantization error is fed back to an input side adder 4 of the quantizer 1 by way of a delay circuit 3. The outputs from these noise shaping circuits 14a and 14b are transmitted to D/A converters 15a and 15b, respectively, where they are converted into corresponding analog signals which are then combined together at an adder 16 and attenuated in gain by the half by a ½ attenuator before being taken out at an output terminal 18.

Figure 2:
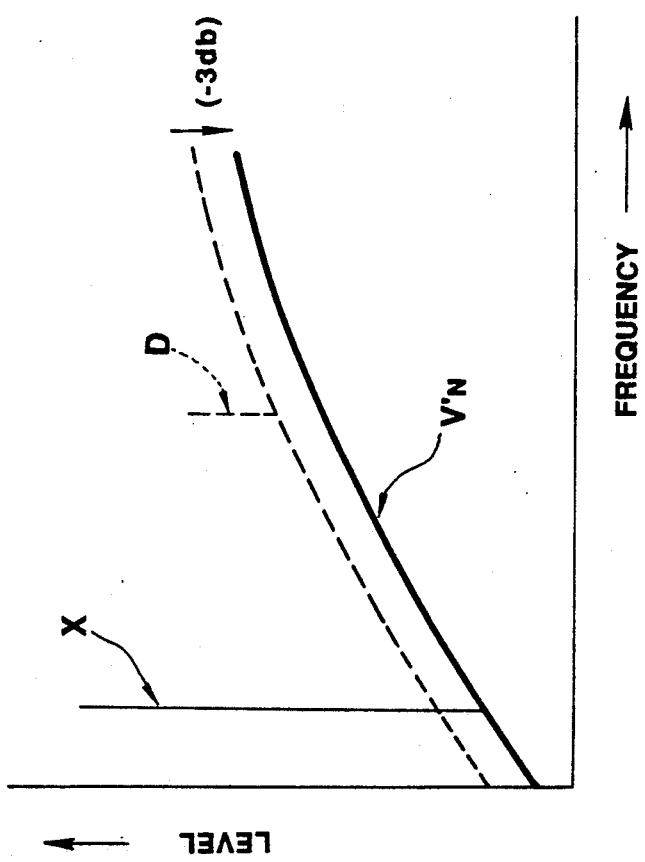
FIG. 2 is a chart showing the frequency spectrum of an output signal in the embodiment shown in FIG. 1.
Figure 7:
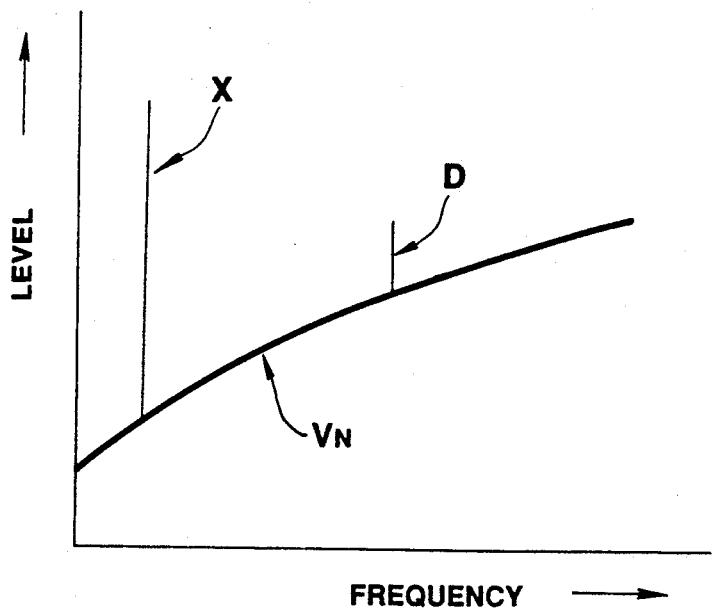
FIG. 7 is a chart showing the frequency diagram of an output signal of the apparatus shown in FIG. 6.

In the above described signal processing apparatus 10, the dither signal D from the dither generator 13 is added to the input signal X to the input terminal 11 at the adder 12a, while it is subtracted from the input signal at the other adder 12b, and the resulting sum and subtraction signals are subjected separately to noise shaping. Thus an output signal $Y_1$ of an addition system and an output signal $Y_2$ of a subtraction system may be represented by the formulas (3) and (4)

$$Y_1 = X + D + V_N \quad (3)$$

$$Y_2 = X - D + V_N' \quad (4)$$

respectively, where $V_N$ and $V_N'$ are quantization noises at the noise shaping circuits 14a and 14b, respectively. These signals $Y_1$ and $Y_2$ are combined together at the adder 16 to cancel the dither signal D completely. The input signal becomes 2X by such addition, that is the amplitude is doubled, so that the power is equal to $(2X)^2$. On the other hand, the quantization noises $V_N$ and $V_N'$ are of a random phase, so that the noise power after the above addition is equal to $V_N^2 + V_N'^2$ and, if the noises are of equal amplitude, the noise power is equal to $2V_N^2$. Hence the power ratio of the signal component to the quantization noise or S/N ratio is given by the formula (5)

$$S/N = 4X^2/2V_N^2 = 2(X^2/V_N^2) \quad (5)$$

which means that the S/N ratio is twice that of the prior art system indicated by the formula (2), that is, the S/N ratio is improved 3 decibels (dB). FIG. 2 shows the frequency spectrum of the output signal following such addition. The broken line in FIG. 2 illustrates, for reference sake, the frequency spectrum in the prior art which by itself is shown in FIG. 7.

Also, since the dither signal introduced at the input side has been cancelled in the ultimate output signal, the dither signal, which has been thought impossible to superimpose in the audio range, can now be superimposed in the audio range. For example, the M-series random number signal, which is not placed under bandwidth limitation, may be used as the dither signal.

Figure 3:
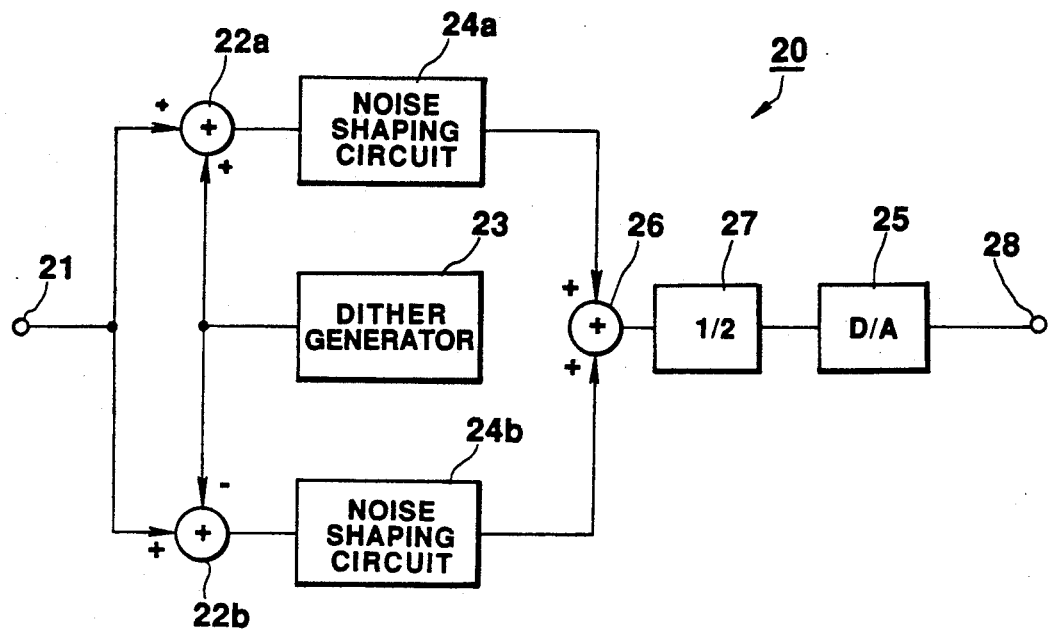
FIG. 3 is a block circuit diagram showing a second embodiment of a signal processing apparatus according to the present invention.

FIG. 3 shows a second embodiment of the present invention in which the D/A conversion of the first embodiment is performed at the last stage.

In the signal processing circuit 20, shown in FIG. 3, the input signal supplied to an input terminal 21 is transmitted therefrom to adders 22a and 22b where dither signals from a dither generator 13 are added to or subtracted from the input signal and the resulting sum and difference signals are supplied to noise shaping circuit 24a and 24b respectively. The outputs from these noise shaping circuits 24a and 24b are combined together in advance at an adder 26 where the dither signal components are cancelled and the input signal components are combined together. The output from the adder 26 is attenuated by ½ by a ½ attenuator 27 and the attenuated signal is transmitted to a D/A converter 25 for D/A conversion before being taken out at an output terminal 28.

The second embodiment is similar in operation and result to the above described first embodiment and, besides, is economically more advantageous since only one D/A converter suffices.

By way of a modification, input signals having opposite polarities or phases may be superimposed on a dither signal of the same polarity or phase and signal subtraction may be performed after noise shaping.

Figure 4:
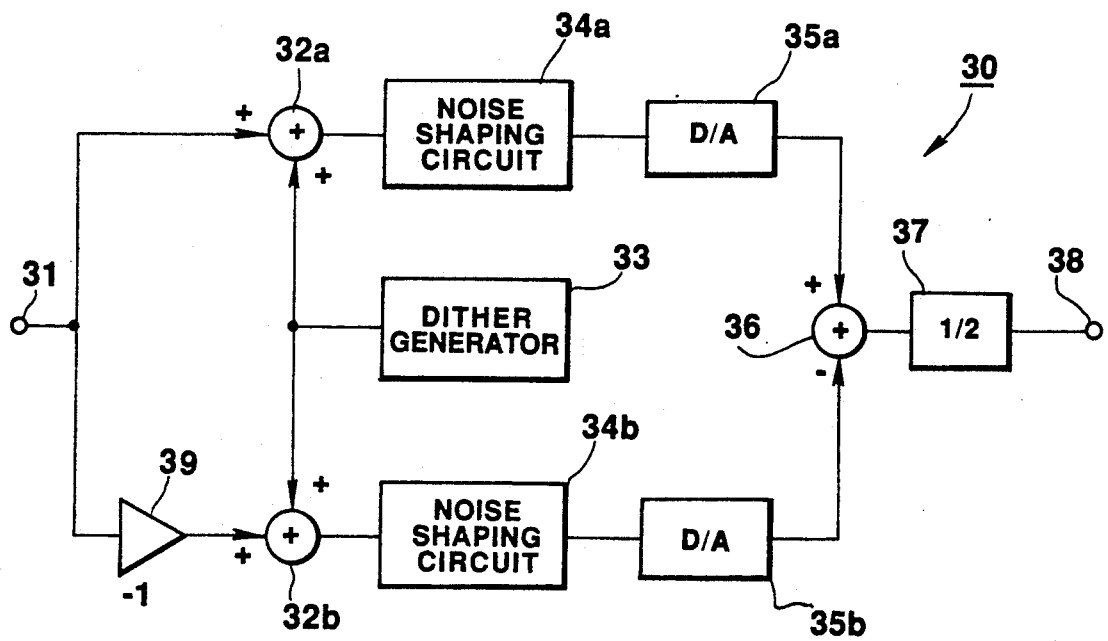
FIG. 4 is a block circuit diagram showing a third embodiment of a signal processing apparatus according to the present invention.

Thus, in a signal processing circuit 30 according to a third embodiment, shown in FIG. 4, an input signal supplied to an input terminal 31 is supplied to an adder 32a while being inverted in polarity or phase by an inverter 39 and supplied to an adder 32b. In these adders 32a and 32b, the dither signal from the dither generator 33 is added to the inverted input signal and to the non-inverted input signal. Since the input signals are reversed in polarity, or phase, relative to each other, the input signals and the dither signals are subjected to addition on one hand and to relative subtraction on the other. The outputs from these adders 32a and 32b are transmitted to noise shaping circuits 34a and 34b, respectively and thence to D/A converters 35a and 35b, respectively, so as to be converted into corresponding signals which are supplied to an adder 36. In the adder 36, one of the signals is subtracted from the other, so that the input signal components having opposite polarity or phase to each other are combined together. The output from the adder 36 is attenuated in gain by ½ by a ½ attenuator 37 before being taken out at an output terminal 38.

It is to be noted that the present third embodiment gives rise to the operation and result similar to that of the above described first embodiment. Meanwhile, in the present third embodiment, the outputs from the noise shaping circuits 34a and 34b may be subjected to subtraction at an adder and the resulting difference signal may then be converted into a corresponding signal by one D/A converter, similarly to the above described second embodiment.

The above description has been made of an example of using two noise shaping circuits. Alternatively, provision may be made of an n number of signal processing circuits, each having two noise shaping circuits, and an n number of different dither signals may be used in the signal processing circuits.

Figure 5:
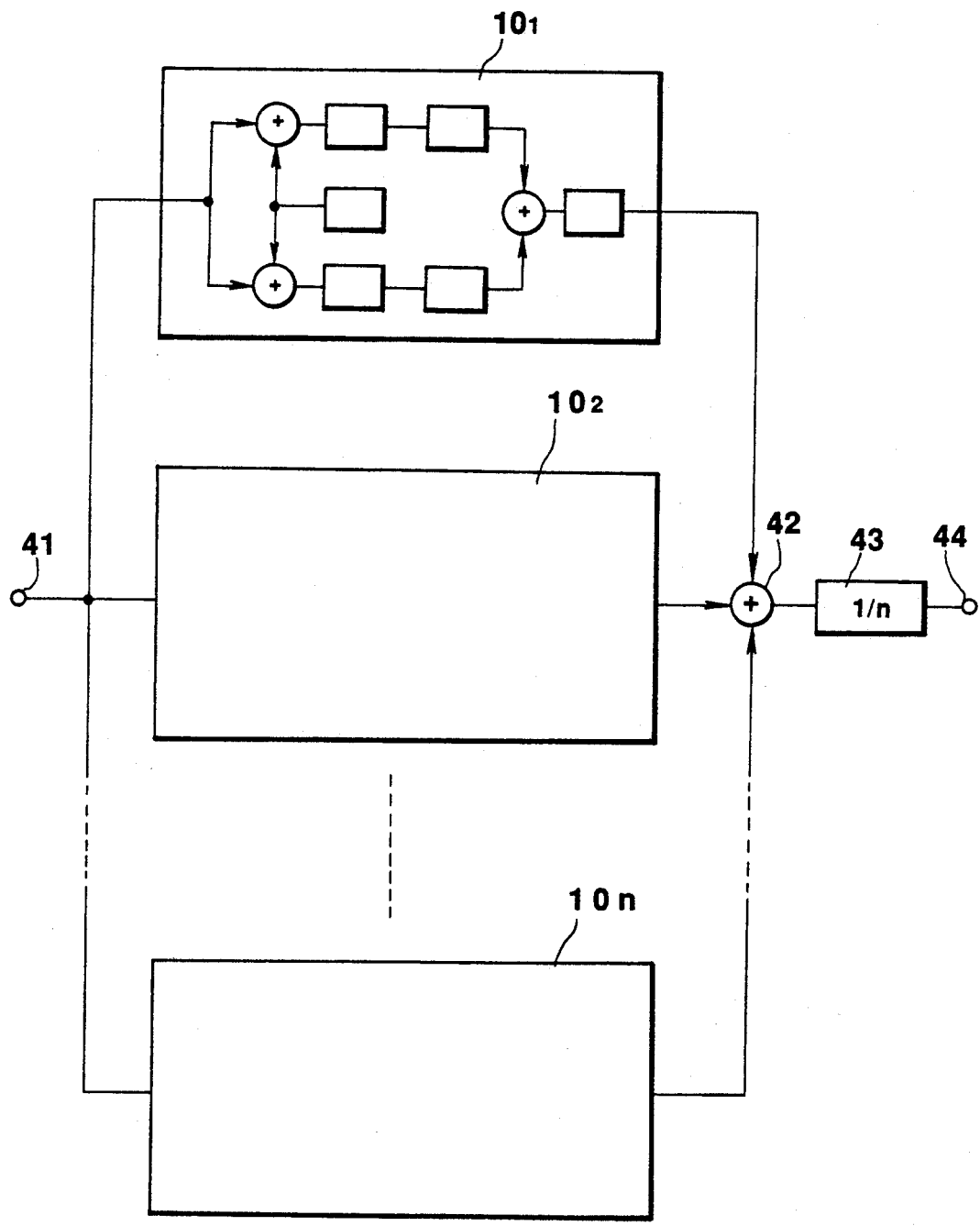
FIG. 5 is a block circuit diagram showing a fourth embodiment of a signal processing apparatus according to the present invention.
Figure 6:
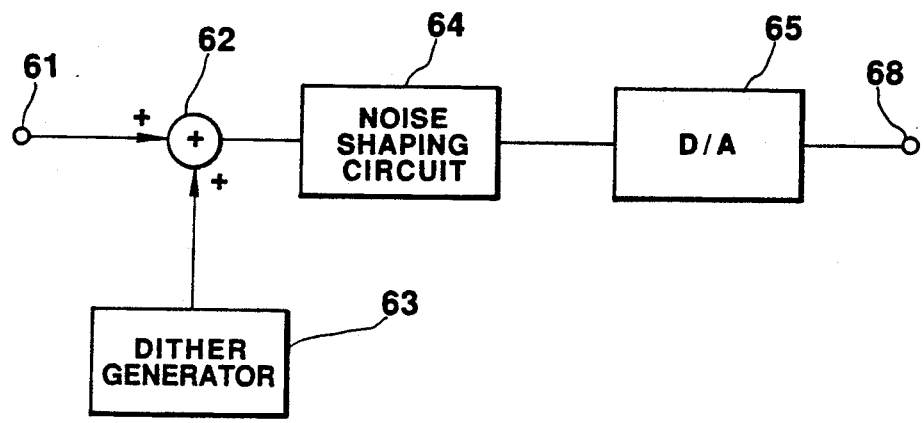
FIG. 6 is a block circuit diagram showing a conventional signal processing apparatus.

Thus, according to a fourth embodiment, shown in FIG. 5, each of circuits $10_1, 10_2, \ldots, 10_n$ is the same as the signal processing apparatus 10 of the above described first embodiment and different dither signals are used in the respective circuits $10_1$ to $10_n$. An input signal from an input terminal 41 is supplied to each of these circuits $10_1$ to $10_n$. The output signals from these circuits $10_1$ to $10_n$ are supplied to an adder 42 and thence to a 1/n attenuator 43 where the output signal of the adder 42 is attenuated by 1/n before being taken out at an output terminal 44. As these circuits $10_1$ to $10_n$, the signal processing circuits 20 or 30 may be used either alone or in combination. It is however necessary to use different dither signals for the circuits $10_1$ to $10_n$.

In the fourth embodiment, shown in FIG. 5, the S/N ratio of the output signal at the output terminal 44 is improved further and by $3 \times \log_2 n$ decibels (dB).

According to the signal processing apparatus of the present invention, dither signal components in the output signal may be cancelled completely so that the necessity of providing an analog LPF, for example, for D/A conversion, may be eliminated to simplify the circuitry, while the signals not placed under bandwidth limitations, such as M series signals, may be used as the dither signals. The signal to noise ratio may also be improved since the input signal components in the noise shaping circuit outputs are effectively summed together at the final stage of signal processing.

What is claimed is:

1. Signal processing apparatus comprising a plurality of signal processing circuits to each of which an input signal is supplied in parallel, each of said signal processing circuits comprising
    a dither generator for generating a dither signal,
    means for forming an addition signal representing a relative addition of said input signal and said dither signal,
    means for forming a subtraction signal representing a relative subtraction between said input signal and said dither signal,
    a first noise shaping circuit to which said addition signal is supplied,
    a second noise shaping circuit to which said subtraction signal is supplied,
    first combining means for effectively combining respective components of output signals of said first and second noise shaping circuits, and
    second combining means for combining the outputs of said signal processing circuits,
    further comprising an n number of said signal processing circuits and gain control means for attenuating the output of said second combining means by 1/n.

2. Signal processing apparatus according to claim 1 wherein said first combining means comprises an adder for adding the outputs of said first and second noise shaping circuits to each other.

3. Signal processing apparatus according to claim 1 wherein
said subtraction signal is the sum of an inversion of said input signal and said dither signal.

4. Signal processing apparatus according to claim 3 wherein said first combining means comprises a subtractor for subtracting the output of said second noise shaping circuit from the output of said first noise shaping circuit.

5. Signal processing apparatus according to claim 1 wherein each of said dither generators generates a separate dither signal.

* * * * *